US007626836B2

(12) United States Patent  
Leggate et al.

(10) Patent No.: US 7,626,836 B2  
(45) Date of Patent: Dec. 1, 2009

(54) METHOD AND APPARATUS FOR ADJUSTABLE VOLTAGE/ADJUSTABLE FREQUENCY INVERTER CONTROL

(75) Inventors: David Leggate, New Berlin, WI (US); Gary Leonard Skibinski, Milwaukee, WI (US); Gary R. Woltersdorf, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 386 days.

(21) Appl. No.: 11/259,510

(22) Filed: Oct. 26, 2005

(65) Prior Publication Data

US 2007/0091653 A1    Apr. 26, 2007

(51) Int. Cl.  
*H02M 1/12* (2006.01)  
*H02M 1/14* (2006.01)  
(52) U.S. Cl. .................. 363/41; 318/599; 318/801; 318/808; 363/164; 363/165
(58) Field of Classification Search .............. 318/801, 318/808; 323/282, 283; 363/16, 41, 131, 363/159, 164, 165  
See application file for complete search history.

(56) References Cited

U.S. PATENT DOCUMENTS

| | | | | |
|---|---|---|---|---|
| 4,426,608 A | * | 1/1984 | Larson et al. | 318/685 |
| 4,634,952 A | * | 1/1987 | Yoshino et al. | 318/811 |
| 4,982,147 A | * | 1/1991 | Lauw | 318/729 |
| 5,010,287 A | * | 4/1991 | Mukai et al. | 318/801 |
| 5,790,396 A | * | 8/1998 | Miyazaki et al. | 363/96 |
| 6,469,469 B1 | * | 10/2002 | Chambers et al. | 318/801 |
| 7,468,595 B2 | * | 12/2008 | Lee et al. | 318/802 |
| 2003/0198065 A1 | * | 10/2003 | Hayashi et al. | 363/35 |
| 2006/0113974 A1 | * | 6/2006 | Kan et al. | 323/282 |

* cited by examiner

*Primary Examiner*—Edward Tso  
*Assistant Examiner*—Arun Williams  
(74) *Attorney, Agent, or Firm*—Quarles & Brady LLP; Alexander R. Kuszewski

(57) ABSTRACT

An apparatus and method for controlling an inverter, the apparatus including an adjustable frequency controller receiving a reference frequency value and generating a command frequency value as a function thereof, an adjustable voltage controller receiving a reference voltage value and generating a command voltage value as a function thereof and independent of the command frequency and a modulator receiving the command frequency value and the command voltage value and generating pulse width modulated (PWM) inverter control signals as a function thereof.

32 Claims, 7 Drawing Sheets

METHOD AND APPARATUS FOR ADJUSTABLE VOLTAGE/ADJUSTABLE FREQUENCY INVERTER CONTROL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more specifically to a method and apparatus for driving an inverter where the frequency and magnitude of AC output voltages to a load are independently controllable.

There are several different standard inverter control modes that are known in the industry including a volts per hertz (V/Hz) mode and a vector control mode. In the V/Hz mode, during regular modulation, inverter output voltage/frequency linearity is achieved by maintaining a constant voltage/frequency ratio over a linear operating region. When operating during overmodulation (e.g., non-linear region of operation), control is compensated for lost voltage so that the voltage output profile remains linear.

While V/Hz and vector control modes of operation are well suited to driving three phase loads such as motors, unfortunately these modes are not well suited to driving other load types where variable voltage at a fixed frequency or variable frequency at a fixed voltage may be desired such as, for instance, in systems provided to power linear motors, vibration welders, induction heaters, power supplies, vibratory feeders/conveyors, electromagnetic stirrers, resistive loads and other non-motor load applications.

BRIEF SUMMARY OF THE INVENTION

The present invention includes an adjustable voltage/adjustable frequency inverter controller that can, as the label implies, independently control inverter output voltage and frequency so that variable voltage at constant frequency or variable frequency at constant voltage control can be effected. Thus, AC waveforms that have frequencies and voltages that are optimized for specific applications can be generated and delivered to specific loads using a single versatile drive configuration. Here, the variable voltage and variable frequency are independently controllable at all times and more specifically during normal inverter operation where normal operation is after start-up and does not include periods of load braking activity.

According to another inventive aspect, during a commissioning procedure, a resonant frequency for a system that includes a controller, an inverter and a load can be determined by sweeping a reference frequency through a range of possible frequencies with a single reference voltage and the frequency at which a peak inverter current value occurs. Here, the frequency at which the peak current value occurs is set, in at least some applications, as a reference frequency for subsequent use.

According to yet another inventive aspect, a single drive is provided that can be operated in any of a V/Hz mode, a vector control mode and an adjustable voltage/adjustable frequency mode so that a single drive can be used in a massive number of different applications.

According to still another aspect, a drive including a single adjustable voltage-adjustable frequency (AVAF) controller is provided that can be used to drive one or three inverter phases.

An apparatus for controlling an inverter, the apparatus comprising an adjustable frequency controller receiving a reference frequency value and generating a command frequency value as a function thereof, an adjustable voltage controller receiving a reference voltage value and generating a command voltage value as a function thereof and independent of the command frequency and a modulator receiving the command frequency value and the command voltage value and generating pulse width modulated (PWM) inverter control signals as a function thereof.

In at least some cases the adjustable frequency controller also receives at least one of a maximum frequency value and a minimum frequency value and, wherein, the step of generating a command frequency includes generating the command frequency value as a function of the reference frequency and the at least one of the maximum frequency value and the minimum frequency value.

In some cases the adjustable frequency controller also receives at least one of a frequency acceleration value and a frequency deceleration value and wherein the step of generating a command frequency includes generating the command frequency value as a function of the reference frequency, the at least one of the maximum frequency value and the minimum frequency value and the at least one of a frequency acceleration value and a frequency deceleration value.

In some cases the adjustable frequency controller receives both of the maximum and minimum frequency values and also receives both of a frequency acceleration value and a frequency deceleration value and wherein the step of generating a command frequency value includes generating the command frequency signal as a function of the reference frequency, the maximum frequency value, the minimum frequency value, the frequency acceleration value and the frequency deceleration value.

In some embodiments the adjustable voltage controller also receives at least one of a maximum voltage value and a minimum voltage value and, wherein, the step of generating a command voltage value includes generating the command voltage signal as a function of the reference voltage and the at least one of the maximum voltage value and the minimum voltage value.

In some cases the adjustable voltage controller also receives at least one of a voltage acceleration value and a voltage deceleration value and wherein the step of generating a command voltage value includes generating the command voltage signal as a function of the reference voltage, the at least one of the maximum voltage value and the minimum voltage value and the at least one of a voltage acceleration value and a voltage deceleration value.

In some embodiments the adjustable voltage controller receives both of the maximum and minimum voltage values and also receives both of a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

In some cases the adjustable voltage controller also receives a maximum voltage value, a minimum voltage value, a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

In some cases the frequency controller and the voltage controller also receive separate frequency and voltage ramp specifying data, respectively and, wherein, the frequency and voltage controllers generate the frequency and voltage command values as a function of the reference frequency and the frequency ramp specifying data, and as a function of the reference voltage and the voltage ramp specifying data, respectively.

In some embodiments the apparatus further includes a load current sensor that generates a current feedback signal, the voltage controller receiving the current feedback signal, the voltage controller generating the command voltage value as a function of both the reference voltage value and the current feedback signal.

In some cases the voltage controller also receives a current limit value and wherein the voltage controller compares the current feedback signal to the current limit value and adjusts the command voltage value in response to the results of the comparison.

In some embodiments the apparatus further includes a DC bus voltage sensor that generates a bus voltage feedback signal, the voltage controller receiving the bus voltage feedback signal and generating the command voltage value as a function of both the reference voltage value and the bus voltage feedback signal.

In some cases the modulator is a first modulator of a first type, the apparatus further including at least a second modulator of a second type that is different than the first type and a modulator selector, the selector selecting one of the first and second modulators to receive the command voltage value and the command frequency value, the modulator that receives the command values using the command values to generate PWM inverter control signals as a function thereof.

In addition, some embodiments include a method for controlling an inverter, the method comprising the steps of receiving a reference frequency value, using the reference frequency value to generate a command frequency value, receiving a reference voltage value that is independent of the reference frequency value, using the reference voltage value to generate a command voltage value independent of the reference frequency value and the command frequency value, using the command frequency value and the command voltage value to generate pulse width modulated (PWM) signals for controlling an inverter and using the PWM signals to control an inverter.

In some cases the method further includes the step of receiving at least one of a maximum frequency value and a minimum frequency value and, wherein, the step of generating a command frequency value includes generating the command frequency value as a function of the reference frequency and the at least one of the maximum frequency value and the minimum frequency value.

In some cases the method further includes the step of receiving at least one of a frequency acceleration value and a frequency deceleration value and wherein the step of generating a command frequency value includes generating the command frequency value as a function of the reference frequency, the at least one of the maximum frequency value and the minimum frequency value and the at least one of a frequency acceleration value and a frequency deceleration value.

In some cases the method further includes the steps of receiving both of the maximum and minimum frequency values and also receiving a frequency acceleration value and a frequency deceleration value and wherein the step of generating a command frequency value includes generating the command frequency signal as a function of the reference frequency, the maximum frequency value, the minimum frequency value, the frequency acceleration value and the frequency deceleration value.

In some cases the method further includes the step of receiving at least one of a maximum voltage value and a minimum voltage value and, wherein, the step of generating a command voltage value includes generating the command voltage signal as a function of the reference voltage and the at least one of the maximum voltage value and the minimum voltage value.

In some cases the method further includes the step of receiving at least one of a voltage acceleration value and a voltage deceleration value and wherein the step of generating a command voltage value includes generating the command voltage signal as a function of the reference voltage, the at least one of the maximum voltage value and the minimum voltage value and the at least one of a voltage acceleration value and a voltage deceleration value.

In some cases the method further includes the step of receiving the maximum and minimum voltage values and also receiving both of a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

In some cases the method further includes the step of receiving a maximum voltage value, a minimum voltage value, a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

In some cases the method further includes the step of receiving separate frequency and voltage ramp specifying data, wherein, the frequency and voltage command values are generated as a function of the reference frequency and the frequency ramp specifying data, and as a function of the reference voltage and the voltage ramp specifying data, respectively.

In some cases the method further includes the step of sensing a load current to generate a current feedback signal, the step of generating the command voltage value including generating the command voltage value as a function of both the reference voltage value and the current feedback signal.

In some cases the method further includes the step of receiving a current limit value, the step of generating the command voltage value including comparing the current feedback signal to the current limit value and adjusting the command voltage value in response to the results of the comparison.

In some cases the method further includes the step of sensing a DC bus voltage to generate a bus voltage feedback signal, the step of generating the command voltage value including generating the value as a function of both the reference voltage value and the bus voltage feedback signal.

Some embodiments include a method for controlling an inverter, the method comprising the steps of providing unrelated voltage and frequency signals, using the unrelated voltage and frequency signals to generate pulse width modulated (PWM) signals for controlling an inverter and using the PWM signals to control an inverter.

Moreover, some embodiments include an apparatus for controlling an inverter, the apparatus comprising an interface for specifying a reference frequency value and a reference voltage value that is independent of the reference frequency value, the interface also for specifying at least a subset of additional information including frequency acceleration and deceleration reference values, voltage acceleration and deceleration reference values, maximum and minimum frequency values and maximum and minimum voltage values, an adjustable frequency controller receiving the reference frequency value and, where the subset of additional information includes at least some frequency related information, receiving the at least some frequency related information, and generating a command frequency value as a function thereof, an adjustable voltage controller receiving the reference voltage value and, where the subset of additional information includes at least some voltage related information, receiving the at least some voltage related information, and generating a command voltage value as a function thereof and independent of the command frequency and a modulator receiving the command frequency value and the command voltage value and generating pulse width modulated (PWM) inverter control signals as a function thereof.

Furthermore, some embodiments include a method for controlling an inverter, the method comprising the steps of during a commissioning procedure providing a reference voltage value, providing a reference frequency value that varies between a maximum frequency value and a minimum frequency value, using the reference voltage value and the reference frequency value to generate PWM inverter control signals, using the PWM inverter control signals to drive an inverter, sensing inverter output current and identifying the reference frequency value at which the inverter output current is maximized as a resonant frequency value and after the commissioning procedure using the reference voltage value and the resonant frequency value to generate PWM inverter control signals and using the PWM control signals to drive the inverter.

In some cases the step of providing a reference frequency value that varies between a maximum frequency value and a minimum frequency value includes stepping the reference frequency value through a series of frequencies between the minimum and maximum frequency values.

In some cases the minimum frequency value is 0 Hz.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
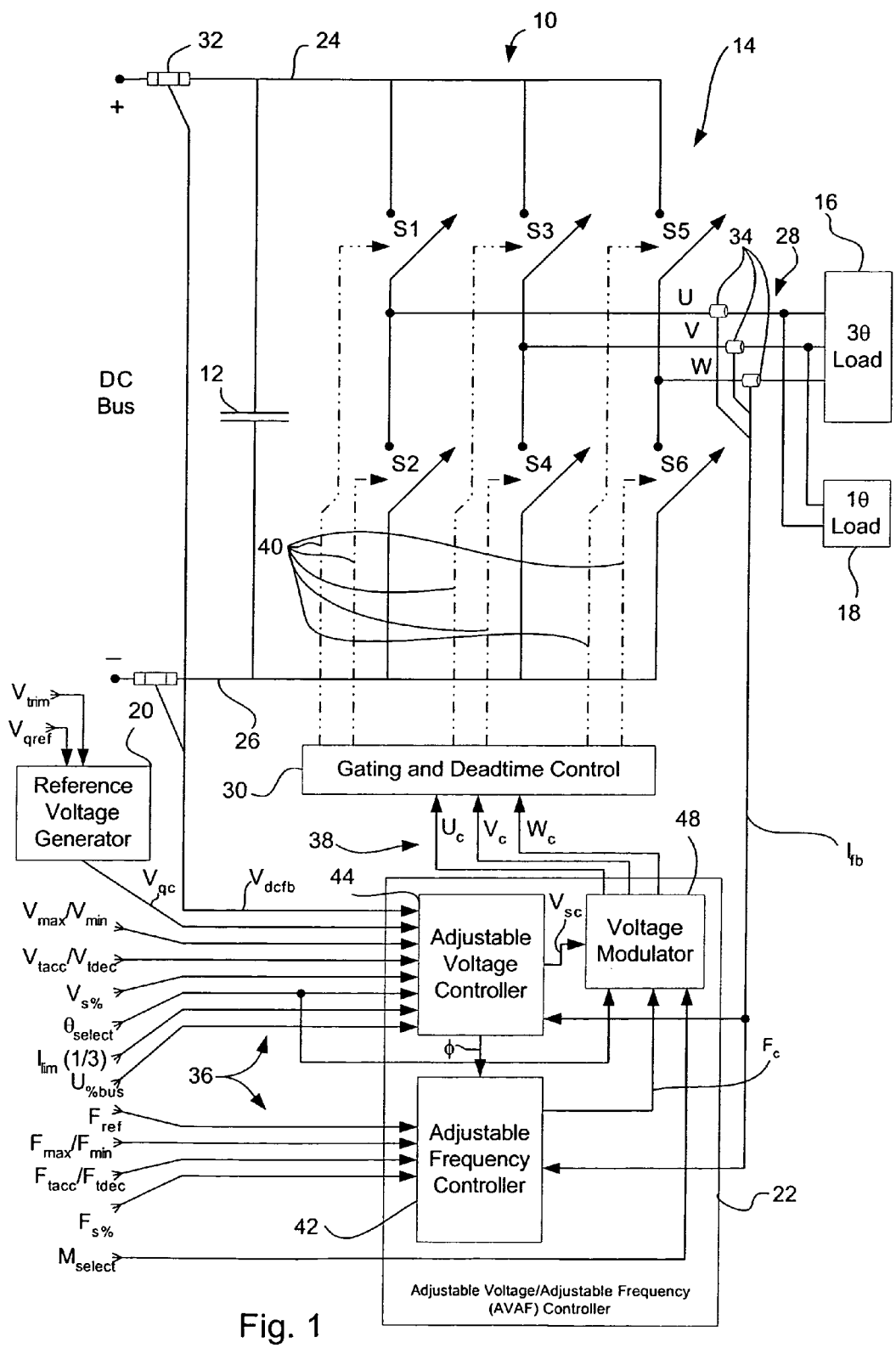
FIG. 1 is a schematic diagram of a system including an adjustable voltage/adjustable frequency controller according to at least one embodiment of the present invention.

Hereinafter, unless indicated otherwise, a subscript "ref" will be used to refer to a reference value, a "q" will be used to refer to a stationary q-axis value, a "d" will be used to refer to a stationary d-axis value, a "trim" subscript will be used to refer to a trim value, a "c" subscript will be used to refer to a command value, an "s" subscript will be used to refer to a synchronous frame value, a "max" subscript will be used to refer to a maximum value, a "min" subscript will be used to refer to a minimum value, an "fb" subscript will be used to refer to a feedback value, a "tacc" subscript will be used to refer to an acceleration time value, a "tdec" subscript will be used to refer to a deceleration time value, a "lim" subscript will be used to refer to a limit value, a "reg" subscript will be used to refer to a regulating value and a "select" subscript will be used to refer to a selection signal provided by a system operator. Other subscripts are used in this specification and the meaning thereof should be apparent from the context in which the subscripts are used.

Referring now to the drawings wherein similar elements are identified by the same number throughout the several views and, more specifically, referring to FIG. 1, the present invention will be described in the context of an exemplary system 10 including, among other components, an inverter 14, a load, an exemplary three-phase load identified by numeral 16 and an exemplary single phase load identified by numeral 18, a reference voltage generator 20, an adjustable voltage/adjustable frequency (AVAF) controller 22 and a gating and deadtime control module 30. Inverter 14 is a three-phase, pulse width modulated (PWM) type inverter capable of inverting a DC bus voltage to three-phase variable frequency and variable voltage AC waveforms that are provided to the load. To this end, as well known in the industry, inverter 14 includes first through sixth controllable switching devices (e.g., IGBTs) that are arranged in serial pairs between positive and negative rails 24 and 26, respectively, of a DC bus. For example, as illustrated, switching devices S1 and S2 are arranged to form a first series pair between buses 24 and 26. Similarly, switching devices S3 and S4 are arranged to form a second serial pair between buses 24 and 26 and switching devices S5 and S6 are arranged to form a third series pair between buses 24 and 26.

A common node linked between switching devices S1 and S2 is linked to a first inverter output line. Similarly, a common node between series devices S3 and S4 is linked to a second inverter output line and common node between devices S5 and S6 is linked to a third inverter output line. The output lines in FIG. 1 are collectively identified by numeral 28 and, as illustrated, provide power to a load (e.g., three-phase load 16). A DC bus capacitor 12 is linked between buses 24 and 26 to reduce bus ripple.

Referring still to FIG. 1, in at least some applications, a DC voltage sensor represented generally by numeral 32 is provided for measuring DC bus voltage across rails 24 and 26 and providing a DC voltage feedback signal $V_{dcfb}$. In addition, in at least some embodiments, current sensors 34 are provided to sense the AC currents passing through inverter output lines 28 and to provide current feedback signals collectively identified by label $I_{fb}$.

Referring again to FIG. 1, reference voltage generator 20, AVAF controller 22 and gating and deadtime control module 30 are designed and configured to generate control signals for inverter switches S1 through S6. In this regard, generator 20 generates a command voltage value $V_{qc}$ which is provided to controller 22 along with other operator settable input values and controller 22 generates three-phase command waveforms $U_c$, $V_c$ and $W_c$ that are provided to control module 30. Control module 30 uses command waveforms $U_c$, $V_c$ and $W_c$ to generate control signals for controlling devices S1-S6 in a manner well known in the art. The control signals are provided on lines 40, a separate line 40 corresponding to each one of switches S1 through S6. The control signals are used to open and close associated switches S1 through S6 thereby creating positive and negative voltage pulses on associated output lines 28 where the RMS value of the pulses on each of the lines 28 averages to provide AC voltages at desired frequencies and that have desired magnitudes.

Figure 2:
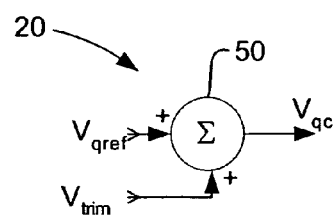
FIG. 2 is a schematic diagram of an exemplary reference voltage generator that may be included as part of the system of FIG. 1.

Referring still to FIG. 1 and also to FIG. 2, in at least some embodiments, reference voltage generator 20 receives a reference voltage value $V_{qref}$ and one or more voltage trim values, one of which is identified by label $V_{trim}$. Here, the trim values (e.g., $V_{trim}$) may either be manually set by a system operator for fine tuning the reference voltage value $V_{qref}$ that is generated by generator 20 or may be provided as part of a closed loop system such that the trim value changes as a function of system operation. As seen in FIG. 2, in a simple case, generator 20 may simply include a summer 50 for adding the initial reference voltage value $V_{qref}$ and the trim values (e.g., $V_{trim}$) to produce a command value $V_{qc}$. Command voltage value $V_{qc}$ is provided to controller 22.

Referring yet again to FIG. 1, AVAF controller 22 includes, in the illustrated example, an adjustable frequency controller module 42, an adjustable voltage controller module 44 and a voltage modulator 48. Hereinafter, unless indicated otherwise, modules 42 and 44 will be referred to as frequency controller 42 and voltage controller 44, respectively. As illustrated, adjustable frequency controller 42 receives a reference frequency value $F_{ref}$, maximum and minimum frequency values $F_{max}$ and $F_{min}$, frequency acceleration and deceleration time values $F_{tacc}$ and $F_{tdec}$, respectively, and, an S-curve percentage value $F_{s\%}$. In addition, frequency controller 42 receives an angle $\phi$ from voltage controller 44. In most applications, angle $\phi$ will have a zero value and therefore, for all practical purposes, frequency controller 42 is decoupled from voltage controller 44 and operates to generate a frequency command value independent of operation of controller 44. Frequency controller 42 uses the input values to generate a frequency command value $F_c$.

Figure 3:
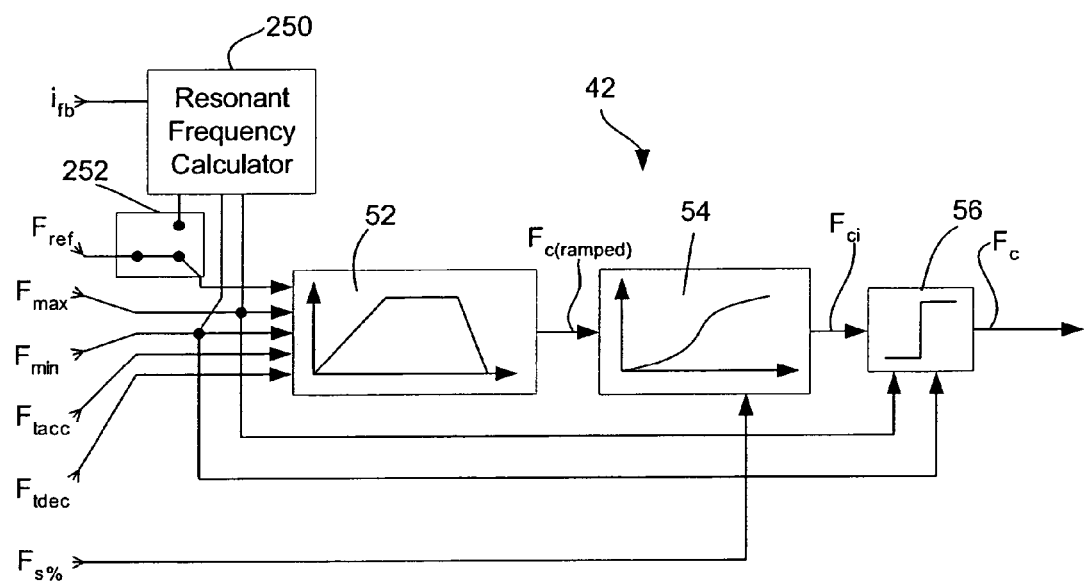
FIG. 3 is a schematic diagram of an exemplary adjustable frequency controller that may be included as part of the controller of FIG. 1.

Referring to FIGS. 1 and 3, to generate frequency command value $F_c$, frequency controller 42 includes a frequency ramp module 52, an S-curve module 54 and a frequency limiter module 56. Frequency ramp module 52 receives the maximum frequency value $F_{max}$, the minimum frequency value $F_{min}$, the frequency acceleration time value $F_{tacc}$ and the frequency deceleration time value $F_{tdec}$ and uses those values to define a frequency ramp. To this end, the frequency acceleration time value $F_{tacc}$ is an acceleration time corresponding to a desired duration over which an output frequency should increase between minimum frequency value $F_{min}$ and the maximum frequency value $F_{max}$. Similarly, the frequency deceleration time value $F_{tdec}$ corresponds to a desired or optimal time over which the output frequency should decrease from the maximum frequency value $F_{max}$ to the minimum frequency value $F_{min}$.

In addition to receiving the maximum, minimum, acceleration and deceleration frequency values, module 52 receives the reference frequency value $F_{ref}$ and uses that value to identify a frequency between the minimum frequency value $F_{min}$ and the maximum frequency value $F_{max}$ that is consistent with the frequency ramp defined by the maximum, minimum, acceleration and deceleration frequency values as well as the previous reference value and outputs a ramped command frequency $F_{c(ramped)}$ to module 54. In addition to receiving the ramped command frequency value $F_{c(ramped)}$, module 54 receives S-curve value $F_{s\%}$. Here, value $F_{s\%}$ defines, as the label implies, an S-curve that is used to dampen acceleration and deceleration requirements during beginning and end portions of acceleration and deceleration activity resulting in smoother frequency changes. Module 54 generates an intermediate command frequency $F_{ci}$ which is provided to limiter module 56.

Referring still to FIG. 3, in addition to receiving the intermediate command frequency $F_{ci}$, limiter module 56 also receives the maximum and minimum frequency values $F_{max}$ and $F_{min}$, respectively. Limiter module 56 compares the intermediate command frequency value $F_{ci}$ to the maximum and minimum frequency values $F_{max}$ and $F_{min}$ and limits its output to within the range between minimum value $F_{min}$ and maximum value $F_{max}$. The output of module 56 is the command frequency value $F_c$. Command frequency value $F_c$ is provided to voltage modulator 48 as seen in FIG. 1.

Figure 4:
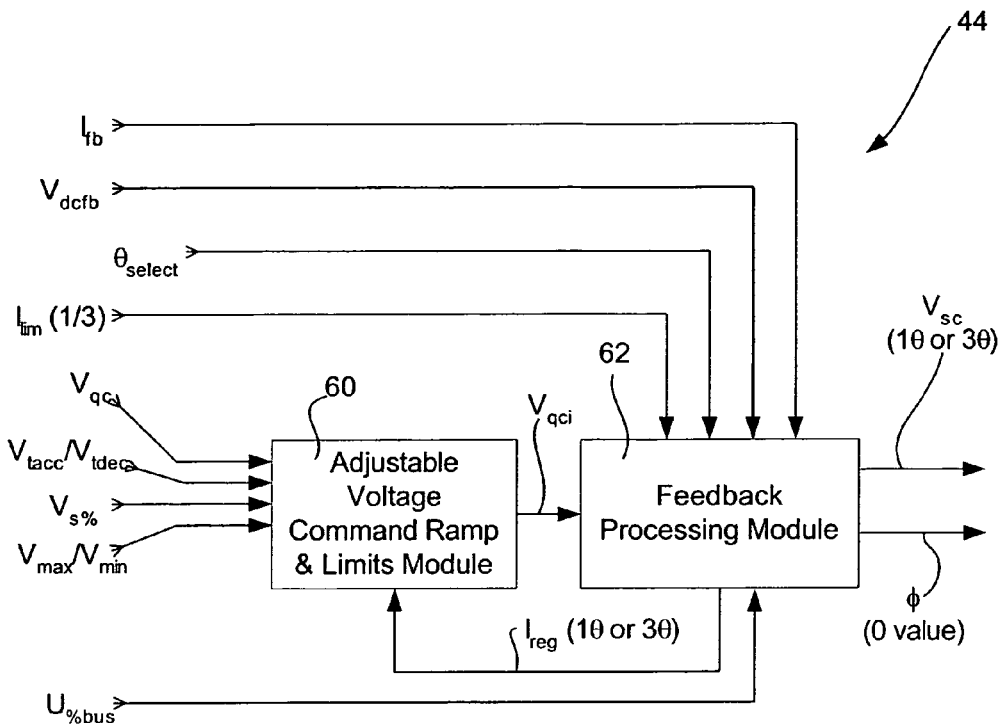
FIG. 4 is a schematic diagram illustrating an exemplary adjustable voltage controller that may be included as part of the system of FIG. 1.

Referring once again to FIG. 1 and also to FIG. 4, adjustable voltage controller 44 includes an adjustable voltage command ramp and limits module 60 and a feedback processing module 62. Module 60 receives the command voltage value $V_{qc}$, voltage acceleration and deceleration time values $V_{tacc}$ and $V_{tdec}$, respectively, a voltage S-curve percent value $V_{s\%}$ and maximum and minimum voltage values $V_{max}$ and $V_{min}$, respectively. In addition, module 60 receives either one or three phase current regulating signals $I_{lim}$ from feedback processing module 62. Module 60 uses the received values to generate an intermediate command voltage signal $V_{qci}$.

Figure 5:
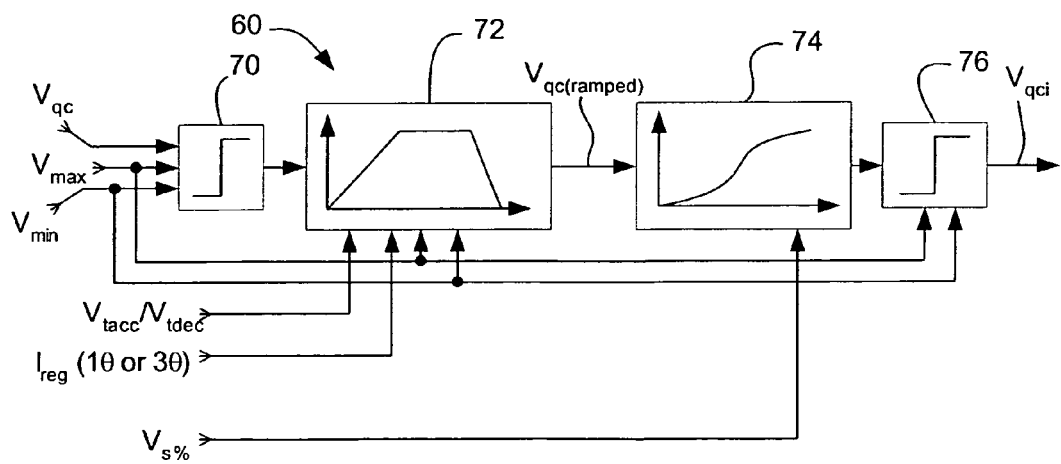
FIG. 5 is a schematic diagram of an exemplary adjustable voltage command ramp and limits module of FIG. 4.

Referring still to FIG. 4 and also to FIG. 5, to generate the intermediate command voltage signal $V_{qci}$, module 60 includes first and second limiters 70 and 76, respectively, a voltage ramp module 72 and a voltage S-curve module 74. Limiter module 70 receives the command voltage value $V_{qc}$, the maximum voltage value $V_{max}$ and the minimum voltage value $V_{min}$ and compares command value $V_{qc}$ to the maximum and minimum values $V_{max}$ and $V_{min}$, respectively, and generates an output value which is within the maximum and minimum voltage range. The output of limiter module 70 is provided to ramp module 72. In addition to receiving the output value from limiter module 70, ramp module 72 receives maximum voltage value $V_{max}$, minimum voltage value $V_{min}$, voltage acceleration time value or time $V_{tacc}$ and the voltage deceleration time value $V_{tdec}$. Module 72 uses the maximum, minimum, acceleration and deceleration voltage values to define a voltage ramp curve. In addition, module 72 compares the command voltage value received from limiter module 70 to the defined voltage ramp to identify a ramped command signal $V_{qc(ramped)}$. Moreover, module 72 receives the regulating current value $I_{reg}$ from the feedback processing module 62 (see again FIG. 4) and uses that value to, when necessary, further limit the ramped voltage value $V_{qc(ramped)}$.

Thus, referring again to FIG. 1, when currents on lines 28 exceed limit values the regulating current signal $I_{reg}$ may cause module 72 to reduce the ramped voltage command signal $V_{qc(ramped)}$. Current regulation is described in greater detail below with reference to FIG. 6.

Referring still to FIG. 5, the ramped command voltage signal $V_{qc(ramped)}$ is provided to S-curve module 74. As in the case of module 54 in FIG. 3, here module 74 dampens the beginning and end portions of acceleration and deceleration activity so that voltage level changes can be affected in a smooth manner. In this regard, module 74 receives the S-curve percentage value $V_{s\ \%}$ which defines the shape and slope of the dampened acceleration and deceleration curve. The output of module 74 is provided to second limiter module 76 which also receives the maximum and minimum voltage values $V_{max}$ and $V_{min}$, respectively. Limiter module 76 limits its output to the range within the maximum and minimum values and generates an intermediate q-axis command voltage value $V_{qci}$.

Figure 6:
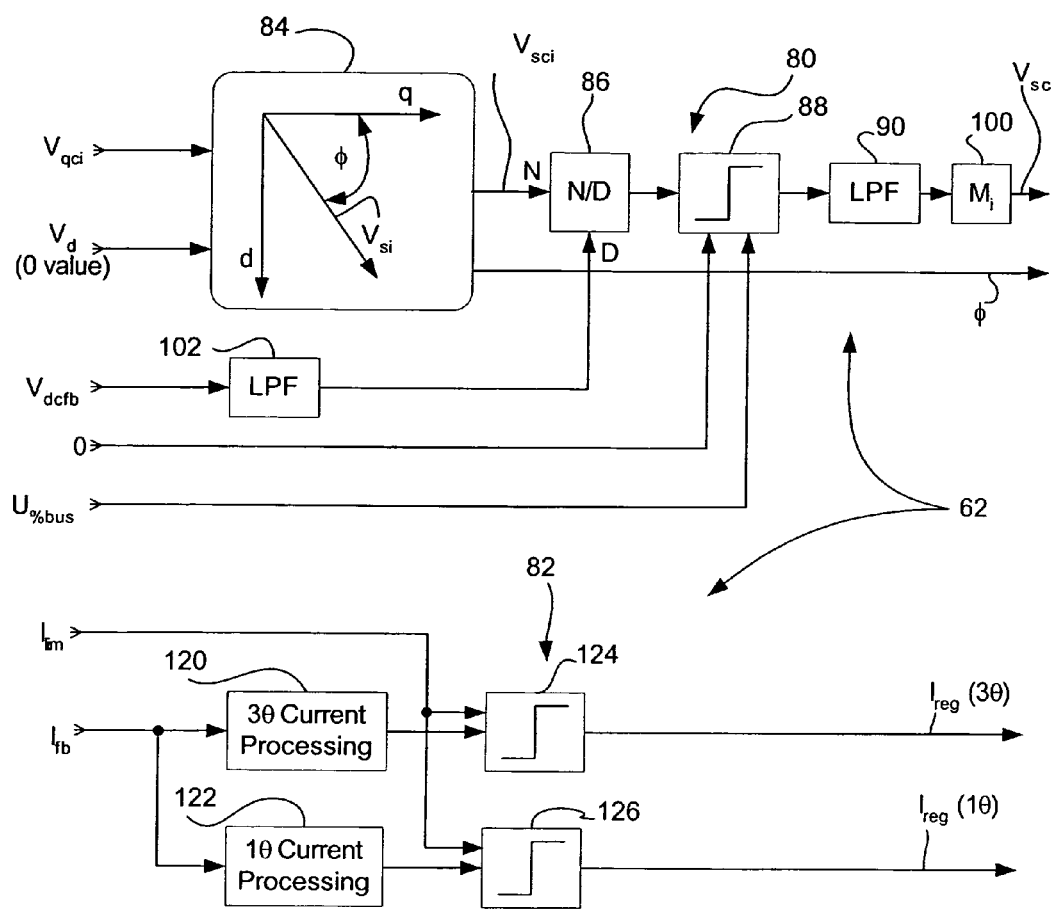
FIG. 6 is a schematic diagram illustrating an exemplary feedback processing module that may be included as part of the controller of FIG. 4.

Referring once again to FIG. 4 and now also to FIG. 6, feedback processing module 62 includes two different subsections, a DC bus voltage limiting section 80 and a current limiting section 82. Section 80 receives the intermediate command voltage value $V_{qci}$, an associated stationary d-axis voltage value $V_d$, the DC bus feedback voltage value $V_{dcfb}$ and a bus utilization value $U_{\%\ bus}$ and uses those values to generate a synchronous command voltage signal $V_{sc}$ and voltage phase angle ϕ. To this end, section 80 includes a stationary to synchronous transformer module 84, a divider module 86, a limiter module 88, first and second low pass filters 90 and 102 and a modulation index multiplier 100. Transformer module 84 receives the intermediate command voltage value $V_{qci}$ and the associated d-axis voltage value $V_d$ and uses those values to generate an intermediate synchronous command voltage value $V_{sci}$ and angle ϕ. Stationary to synchronous transformations like the one performed by module 84 are well known in the motor control art and therefore operation of module 84 is not explained here in detail. For the purposes of this explanation, however, it should be appreciated that the stationary d-axis voltage value $V_d$ will typically be a zero value and therefore the intermediate synchronous command voltage value $V_{sci}$ that is generated by module 84 will typically have a magnitude equal to the intermediate stationary command voltage value $V_{qci}$ and angle ϕ will have a zero value. The transformer module 84 is shown in FIG. 6 simply to indicate how the control methodology will likely be implemented using existing hardware components. In this regard, it should be appreciated that, when other hardware configurations are employed, transformer module 84 may not be required and the stationary command voltage value $V_{qci}$ may simply be provide to divider module 86 while a zero ϕ value may be provided. Value ϕ is provided to summer 140 in FIG. 7.

Referring still to FIG. 6, the DC bus feedback voltage value $V_{dcfb}$ is provided to low pass filter 102 and its output is provided to divider module 86. Divider module 86 divides the intermediate synchronous command voltage value $V_{sci}$ by the filtered DC feedback voltage value $V_{dcfb}$ to generate a ratio of the intermediate command voltage value $V_{sci}$ to the instantaneous DC bus voltage value $V_{dcfb}$.

Limiter module 88 receives both the ratio value from divider module 86 and the maximum bus utilization value $U_{\%\ bus}$ and limits its output to a value that does not exceed the $U_{\%\ bus}$ value. Here, as the label implies, the $U_{\%\ bus}$ value indicates a maximum % of the DC bus voltage that should be utilized. The output of limiter module 88 is provided to low pass filter 90 which filters the value and the output of filter 90 is provided to modulation index multiplier 100 which multiplies the received value by a modulation index $M_i$ thereby generating a synchronous command voltage value $V_{sc}$. Here, the modulation index $M_i$ is calculated in a manner known in the art to compensate for non-linearities in the overmodulation regions of operation. Thus, section 80 outputs a command voltage value $V_{sc}$ and angle ϕ.

Referring still to FIG. 6, the current limiter section 82 receives a current limit value $I_{lim}$ and the inverter output line feedback current signals $I_{fb}$ and uses those values to generate either three-phase or single phase current regulating signals. Section 82 includes a three-phase current processing module 120, a single phase current processing module 122 and first and second limiters 124 and 126, respectively. Feedback current signals $I_{fb}$ are provided to each of the processing module 120 and 122. Processing module 120 identifies the three-phase current value and provides that value to limiter 124. Similarly, single phase current processing module 122 identifies a single phase current value and provides that value to limiter module 126. Each of modules 124 and 126 receives the current limit value $I_{lim}$ and compares the limit value $I_{lim}$ to the values received from modules 120 and 122. Where the three-phase current value exceeds the current limit value $I_{lim}$, section 82 generates the three-phase regulating current signal $I_{reg}$ which, as illustrated in FIG. 5, is provided to ramp module 72 to adjust the ramped voltage value $V_{qc(ramped)}$, as appropriate. Similarly, where the single phase current value received by module 126 exceeds the current limit value $I_{lim}$, module 126 generates a single phase regulating current signal $I_{reg}$ which is provided to ramp module 72 to adjust the ramped voltage value $V_{qc(ramped)}$ as appropriate.

Figure 7:
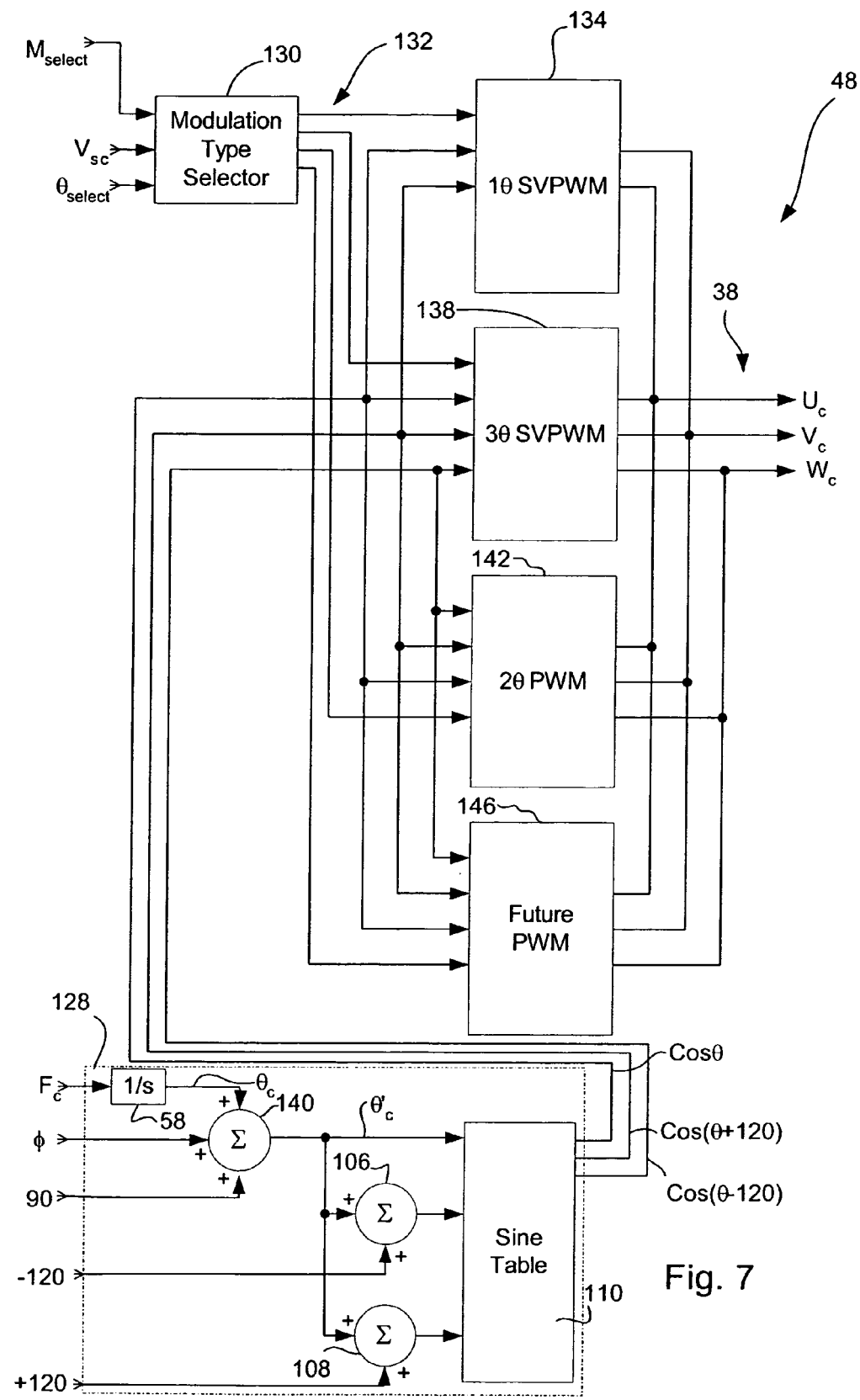
FIG. 7 is a schematic diagram illustrating an exemplary voltage modulator that may be included as a portion of the controller of FIG. 1.

Referring once again to FIG. 1 and also to FIG. 7, voltage modulator 48 receives the command voltage value $V_{sc}$ and the command frequency value $F_c$ and uses those signals to generate modulating waveforms $U_c$, $V_c$ and $W_c$ for driving control module 30. In the present example, it is contemplated that modulator 48 may include a plurality of modules that are capable of generating waveforms $U_c$, $V_c$ and $W_c$ that have different controlled forms that are particularly useful for certain applications. For example, in many applications the well known three-phase space vector pulse width modulation technique may be optimal while in other cases single space vector pulse width modulation may be optimal. In still other cases two-phase pulse width modulation may be desired for some application types.

In the illustrated example, modulator 48 includes a modulation type selector 130, an intermediate waveform generator 128 and a plurality of modulator modules 134, 138, 142, 146, etc., a separate modulator module for each one of the possible modulation schemes that can be implemented using modulator 48. The exemplary modulator modules include a single phase space vector pulse width modulator 134, a three-phase space vector pulse width modulator 138, a two-phase space vector pulse width modulator 142 and a "future" pulse width modulator 146 which is meant to represent any other type of pulse width modulator that is developed in the future.

Intermediate waveform generator 128 includes an integrator module 58, first, second and third summers 140, 106 and 108 and a Sine table 110. Integrator module 58 receives command frequency signal $F_c$ and integrates that value to generate a command angle signal $\theta_c$. First summer 140 receives command angle signal $\theta_c$ and adds that value to angle ϕ+900° to generate a shifted command angle $\theta'_c$. Again, here, in most applications, angle ϕ which is received from voltage controller 44 (see again FIG. 1) will have a zero value and therefore, the shifted command angle $\theta'_c$ is equal to command angle $\theta_c$+90°. Shifted command angle $\theta'_c$ is provided to sine table module 110, second summer 106 and third summer 108. Summer 106 subtracts 120° from the shifted command angle $\theta'_c$ and provides the resulting angle to sine table module 110. Similarly, third summer 108 adds 120° to the shifted command angle $\theta'_c$ and provides it's output angle to sine table module 110. As well known in the art, module 110 uses the three input angle values to generate output waveforms Cosine $\theta$, Cosine ($\theta$+120) and Cosine ($\theta$−120).

Modulation type selector 130, as the label implies, enables a system operator to select any of the modulation schemes corresponding to modules 134, 138, 142, 146, etc. In this regard, type selector 130 receives a modulation selection input signal $M_{select}$ and a phase selection input signal $\theta_{select}$. Input signals $M_{select}$ and $\theta_{select}$ together identify which module 134, 138, etc., should be activated. For instance, signal $M_{select}$ may indicate space vector PWM and signal $\theta_{select}$ may identify either one or three phase operation to activate module 134 or module 138, respectively. Similarly, the $M_{select}$ signal may alone activate two phase PWM module 142. To activate and deactivate modules 134, 138, etc., selector 130 generates control signals via lines 132 to provide the stationary command voltage signal $V_{sc}$ to the selected one of modules 134, 138, etc. For instance, where three phase space vector PWM is to be selected, selector 130 provides voltage signal $V_{sc}$ to module 138 via the associated one of lines 132.

Referring still to FIG. 7, the activated module (e.g., 134, 138 or 142) uses the command voltage signal $V_{sc}$ and the waveforms received to generate command waveforms on lines 38 which are linked to gating and deadtime control module 30 (see again FIG. 1).

At this point it should be apparent that an adjustable voltage-adjustable frequency (AVAF) drive has been described that can be used to control an inverter so that the inverter operating frequency and the magnitude of the inverter output voltage can be controlled completely independently during normal inverter operation and to provide one or three phase output and to control via several different operating modes (e.g., 3θ space vector (SVPWM), etc.). Here, control during normal operation means after start up and during non-braking periods of operation.

Experiments have shown that in at least some applications, given a specific reference voltage value $V_{ref}$, a system 10 may be characterized by a resonant operating frequency $F_{res}$ at which optimal operation occurs. One inventive aspect contemplated here is to determine the resonant operating frequency of a system 10 so that optimal operation can occur. In this regard, an exemplary method 200 for identifying a resonant frequency is illustrated in FIG. 8.

Figure 8:
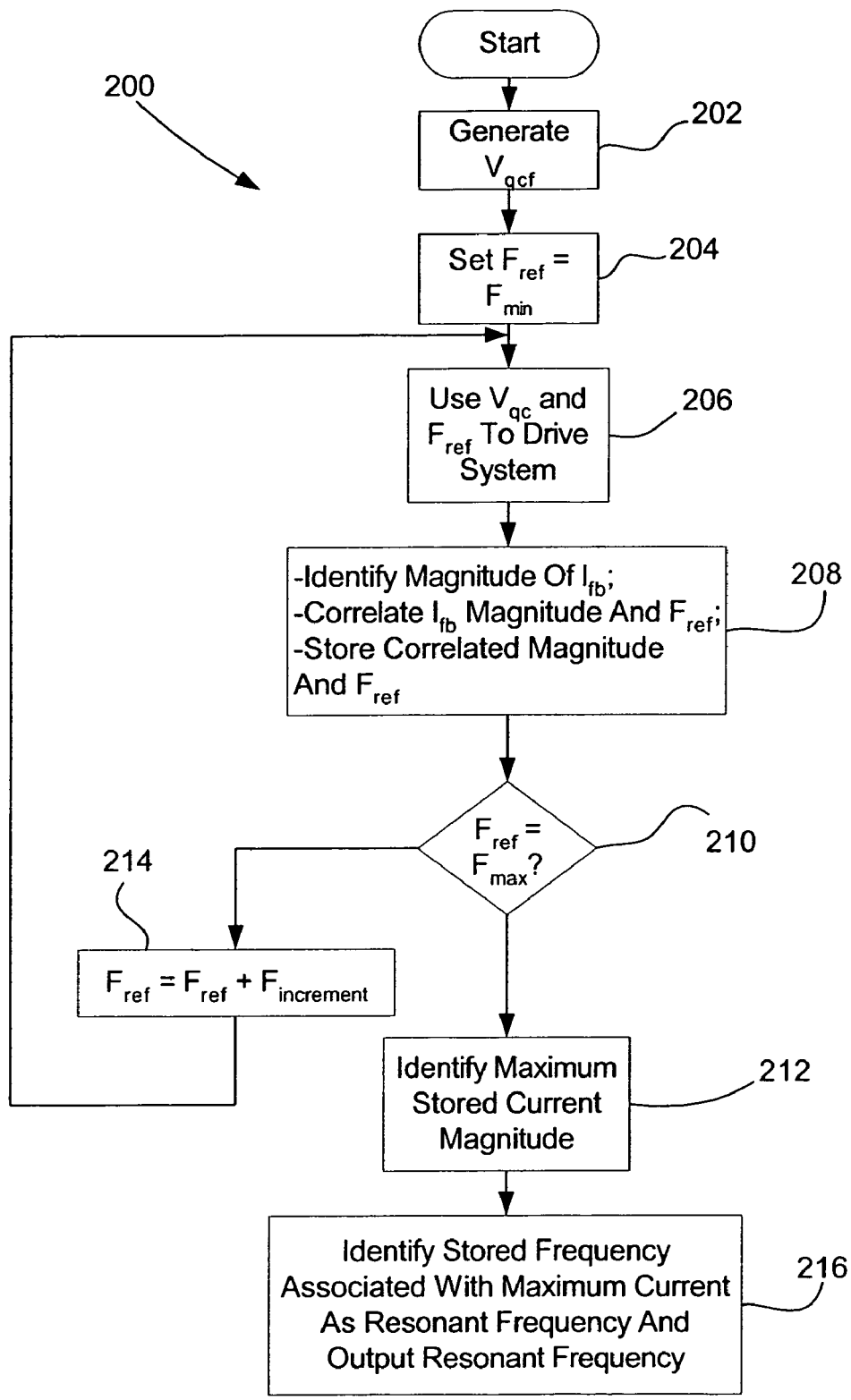
FIG. 8 is a flow chart illustrating a method that may be performed by the resonant frequency calculator of FIG. 3 during a commissioning procedure to identify a resonant frequency of the exemplary system shown in FIG. 1.

Referring also and again to FIG. 3, to perform the FIG. 8 method, module 42 includes additional components 250 and 252. Component 250 is a resonant frequency calculator module and component 252 is a two-pole switch that is operable to select either an operator provided reference frequency $F_{ref}$ or a frequency provided by module 250. During method 200 of FIG. 8, switch 252 is used to select the output frequency of module 250. Module 250 receives inverter feedback current $I_{fb}$ as well as the maximum and minimum frequency values $F_{max}$ and $F_{min}$. Prior to method 200 it is assumed that a system operator uses an interface to input each of the operating parameters $V_{max}$, $V_{min}$, $V_{tacc}$, $V_{tdec}$, $V_{s\%}$, $\theta_{select}$, $I_{lim}$, $U_{\% bus}$, $F_{max}$, $F_{min}$, $F_{tacc}$, $F_{tdec}$, $F_{s\%}$ and $M_{select}$.

Referring to FIGS. 1 and 8, at block 202, generator 20 receives a reference voltage signal $V_{qref}$ and uses that signal to generate a command voltage signal $V_{qc}$ that is provided to controller 22. At block 204, module 250 sets the reference frequency $F_{ref}$ equal to minimum frequency value $F_{min}$. At block 206, the reference voltage and instantaneous reference frequency $F_{ref}$ (i.e., $F_{min}$) are used to drive system 10 for at least one cycle after which the reference frequency reaches a steady state. At block 208, module 250 identifies the magnitude of the feedback current $I_{fb}$, correlates the feedback current magnitude with the instantaneous reference frequency $F_{ref}$ and stores the correlated magnitude and frequency values.

Referring still to FIGS. 1 and 8, at block 210, module 250 determines if the instantaneous reference frequency $F_{ref}$ is equal to the maximum frequency value $F_{max}$. Where the reference frequency $F_{ref}$ is equal to the maximum value $F_{max}$, control passes to block 212. If the reference frequency $F_{ref}$ is less than the maximum value $F_{max}$, at block 214, the reference frequency is increased by a small amount (e.g., 1-2 Hz) and control passes back up to block 206 where system 10 is driven with the reference voltage and the increased reference frequency. This process continues until control passes to block 212.

Once control passes to block 212, module 250 compares the stored current magnitude values to identify the maximum current magnitude. At block 216, module 250 identifies the frequency that is correlated with the identified current magnitude value as the resonant frequency of the system. At this point, module 250 may output the resonant frequency to drive the system directly or may provide the resonant frequency to be used as the reference value $F_{ref}$ during normal operation.

Figure 9:
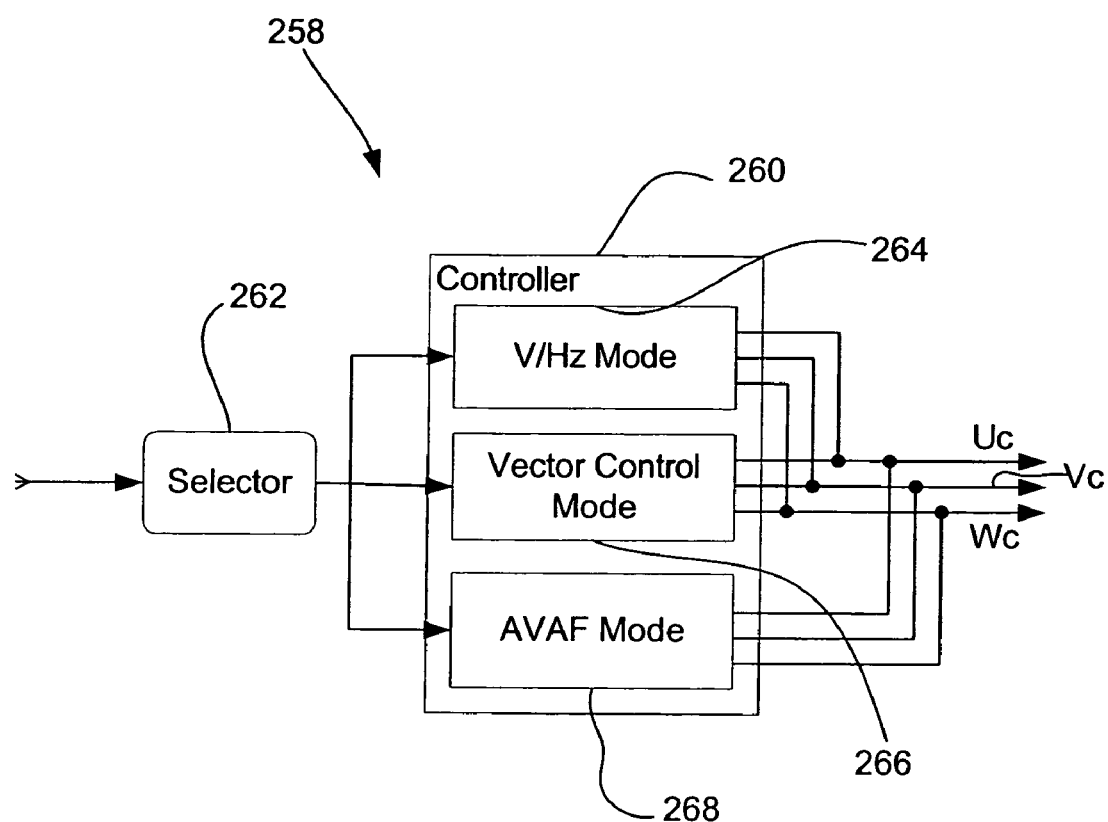
FIG. 9 is a schematic diagram of a three mode controller consistent with at least some inventive aspects.

Referring to FIG. 9, an exemplary control system 258 is illustrated that may facilitate any of the three separate operating modes including V/Hz, vector control and AVAF control, depending upon user selection input. To this end, system 258 includes a three mode controller 260 and a selector module 262. Controller 260 is shown as being able to facilitate any of the V/Hz mode 264 of operation, the vector control mode 266 and the AVAF mode 268 described above where modulation waveforms $U_c$, $V_c$ and $W_c$ are generated on lines 38 (see also FIG. 1) to drive inverter 14 via control module 30. Here, controller 260 is particularly versatile and can be used for many different applications.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. An apparatus for controlling an inverter to provide exciting currents to stator windings of an induction motor that includes a rotor where the rotor is not physically connected to an external excitation source, the apparatus comprising:

an adjustable frequency controller receiving a reference frequency value and generating a command frequency value as a function thereof;

an adjustable voltage controller receiving a reference voltage value and generating a command voltage value as a function thereof and independent of the command frequency; and a modulator receiving the command frequency value and the command voltage value and generating pulse width modulated (PWM) inverter control signals as a function thereof; wherein the inverter control signals are provided to the inverter to control the inverter.

2. The apparatus of claim 1 wherein the adjustable frequency controller also receives at least one of a maximum frequency value and a minimum frequency value and, wherein, the step of generating a command frequency includes generating the command frequency value as a function of the reference frequency and the at least one of the maximum frequency value and the minimum frequency value.

3. The apparatus of claim 2 wherein the adjustable frequency controller also receives at least one of a frequency acceleration value and a frequency deceleration value and wherein the step of generating a command frequency includes generating the command frequency value as a function of the reference frequency, the at least one of the maximum frequency value and the minimum frequency value and the at least one of a frequency acceleration value and a frequency deceleration value.

4. The apparatus of claim 2 wherein the adjustable frequency controller receives both of the maximum and minimum frequency values and also receives both of a frequency acceleration value and a frequency deceleration value and wherein the step of generating a command frequency value includes generating the command frequency signal as a function of the reference frequency, the maximum frequency value, the minimum frequency value, the frequency acceleration value and the frequency deceleration value.

5. The apparatus of claim 4 wherein the adjustable voltage controller also receives a maximum voltage value, a minimum voltage value, a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

6. The apparatus of claim 1 wherein the adjustable voltage controller also receives at least one of a maximum voltage value and a minimum voltage value and, wherein, the step of generating a command voltage value includes generating the command voltage signal as a function of the reference voltage and the at least one of the maximum voltage value and the minimum voltage value.

7. The apparatus of claim 6 wherein the adjustable voltage controller also receives at least one of a voltage acceleration value and a voltage deceleration value and wherein the step of generating a command voltage value includes generating the command voltage signal as a function of the reference voltage, the at least one of the maximum voltage value and the minimum voltage value and the at least one of a voltage acceleration value and a voltage deceleration value.

8. The apparatus of claim 7 wherein the adjustable voltage controller receives both of the maximum and minimum voltage values and also receives both of a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

9. The apparatus of claim 1 wherein the frequency controller and the voltage controller also receive separate frequency and voltage ramp specifying data, respectively and, wherein, the frequency and voltage controllers generate the frequency and voltage command values as a function of the reference frequency and the frequency ramp specifying data, and as a function of the reference voltage and the voltage ramp specifying data, respectively.

10. The apparatus of claim 1 further including a load current sensor that generates a current feedback signal, the voltage controller receiving the current feedback signal, the voltage controller generating the command voltage value as a function of both the reference voltage value and the current feedback signal.

11. The apparatus of claim 10 wherein the voltage controller also receives a current limit value and wherein the voltage controller compares the current feedback signal to the current limit value and adjusts the command voltage value in response to the results of the comparison.

12. The apparatus of claim 1 further including a DC bus voltage sensor that generates a bus voltage feedback signal, the voltage controller receiving the bus voltage feedback signal and generating the command voltage value as a function of both the reference voltage value and the bus voltage feedback signal.

13. The apparatus of claim 1 wherein the modulator is a first modulator of a first type, the apparatus further including at least a second modulator of a second type that is different than the first type and a modulator selector, the selector selecting one of the first and second modulators to receive the command voltage value and the command frequency value, the modulator that receives the command values using the command values to generate PWM inverter control signals as a function thereof.

14. The apparatus of claim 1 wherein the modulator controls the inverter during normal inverter operation.

15. The apparatus of claim 1 further including a selector, a controller that performs a V/Hz mode of operation and a controller that performs a vector control mode operation wherein the selector module receives an input signal selecting one of the V/Hz mode, the vector control mode and an adjustable voltage/adjustable frequency mode and in response activates one of the V/Hz mode, the vector control mode and the adjustable voltage controller, adjustable frequency controller and modulator.

16. A method for controlling an inverter to provide exciting currents to stator windings of an induction motor that includes a rotor where the rotor is not physically connected to an external excitation source, the method comprising the steps of providing a controller that is programmed to perform the steps of:
receiving a reference frequency value;
using the reference frequency value to generate a command frequency value;
receiving a reference voltage value that is independent of the reference frequency value;
using the reference voltage value to generate a command voltage value independent of the reference frequency value and the command frequency value;
using the command frequency value and the command voltage value to generate pulse width modulated (PWM) signals for controlling the inverter; and
using the PWM signals to control the inverter.

17. The method of claim 16 further including the step of receiving at least one of a maximum frequency value and a minimum frequency value and, wherein, the step of generating a command frequency value includes generating the command frequency value as a function of the reference frequency and the at least one of the maximum frequency value and the minimum frequency value.

18. The method of claim 17 further including the step of receiving at least one of a frequency acceleration value and a frequency deceleration value and wherein the step of generating a command frequency value includes generating the command frequency value as a function of the reference frequency, the at least one of the maximum frequency value and the minimum frequency value and the at least one of a frequency acceleration value and a frequency deceleration value.

19. The method of claim 17 further including the steps of receiving both of the maximum and minimum frequency values and also receiving a frequency acceleration value and a frequency deceleration value and wherein the step of generating a command frequency value includes generating the command frequency signal as a function of the reference frequency, the maximum frequency value, the minimum frequency value, the frequency acceleration value and the frequency deceleration value.

20. The method of claim 19 further including the step of receiving a maximum voltage value, a minimum voltage value, a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

21. The method of claim 16 further including the step of receiving at least one of a maximum voltage value and a minimum voltage value and, wherein, the step of generating a command voltage value includes generating the command voltage signal as a function of the reference voltage and the at least one of the maximum voltage value and the minimum voltage value.

22. The method of claim 21 further including the step of receiving at least one of a voltage acceleration value and a voltage deceleration value and wherein the step of generating a command voltage value includes generating the command voltage signal as a function of the reference voltage, the at least one of the maximum voltage value and the minimum voltage value and the at least one of a voltage acceleration value and a voltage deceleration value.

23. The method of claim 22 further including the step of receiving the maximum and minimum voltage values and also receiving both of a voltage acceleration value and a voltage deceleration value and wherein the step of generating a command voltage value includes generating the command voltage signal as a function of the reference voltage, the maximum voltage value, the minimum voltage value, the voltage acceleration value and the voltage deceleration value.

24. The method of claim 16 further including the step of receiving separate frequency and voltage ramp specifying data, wherein, the frequency and voltage command values are generated as a function of the reference frequency and the frequency ramp specifying data, and as a function of the reference voltage and the voltage ramp specifying data, respectively.

25. The method of claim 16 further including the step of sensing a load current to generate a current feedback signal, the step of generating the command voltage value including generating the command voltage value as a function of both the reference voltage value and the current feedback signal.

26. The method of claim 25 further including the step of receiving a current limit value, the step of generating the command voltage value including comparing the current feedback signal to the current limit value and adjusting the command voltage value in response to the results of the comparison.

27. The method of claim 16 further including the step of sensing a DC bus voltage to generate a bus voltage feedback signal, the step of generating the command voltage value including generating the value as a function of both the reference voltage value and the bus voltage feedback signal.

28. The method of claim 16 wherein the sep of using the command frequency value and the command voltage value to generate pulse width modulated (PWM) signals for controlling the inverter includes generating the PWM signals during normal inverter operation.

29. An apparatus for controlling an inverter to provide exciting currents to stator windings of an induction motor that includes a rotor where the rotor is not physically connected to an external excitation source, the apparatus comprising:
an interface for specifying a reference frequency value and a reference voltage value that is independent of the reference frequency value, the interface also for specifying at least a subset of additional information including frequency acceleration and deceleration reference values, voltage acceleration and deceleration reference values, maximum and minimum frequency values and maximum and minimum voltage values;
an adjustable frequency controller receiving the reference frequency value and, where the subset of additional information includes at least some frequency related information, receiving the at least some frequency related information, and generating a command frequency value as a function thereof;
an adjustable voltage controller receiving the reference voltage value and, where the subset of additional information includes at least some voltage related information, receiving the at least some voltage related information, and generating a command voltage value as a function thereof and independent of the command frequency; and
a modulator receiving the command frequency value and the command voltage value and generating pulse width modulated (PWM) inverter control signals as a function thereof; wherein the inverter control signals are provided to the inverter to control the inverter.

30. A method for controlling an inverter to provide exciting currents to stator windings of an induction motor that includes a rotor where the rotor is not physically connected to an external excitation source, the method comprising the steps of providing a controller that is programmed to perform the steps of:
during a commissioning procedure:
receiving a reference voltage value;
receiving a reference frequency value that varies between a maximum frequency value and a minimum frequency value;
using the reference voltage value and the reference frequency value to generate PWM inverter control signals;
using the PWM inverter control signals to drive the inverter;
sensing inverter output current; and
identifying the reference frequency value at which the inverter output current is maximized as a resonant frequency value; and
after the commissioning procedure:
using the reference voltage value and the resonant frequency value to generate PWM inverter control signals; and
using the PWM control signals to drive the inverter.

31. The method of claim 30 wherein the step of providing a reference frequency value that varies between a maximum frequency value and a minimum frequency value includes stepping the reference frequency value through a series of frequencies between the minimum and maximum frequency values.

32. The method of claim 30 wherein the minimum frequency value is 0 Hz.

* * * * *

UNITED STATES PATENT AND TRADEMARK OFFICE
CERTIFICATE OF CORRECTION

PATENT NO. : 7,626,836 B2
APPLICATION NO. : 11/259510
DATED : December 1, 2009
INVENTOR(S) : Leggate et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Second Day of November, 2010

David J. Kappos
*Director of the United States Patent and Trademark Office*